United States Patent Office 3,529,064
Patented Sept. 15, 1970

3,529,064
ANOREXIC COMPOSITION CONTAINING 2-PROPENYL - 2 - CYCLOHEXEN - 1 - ONE AND METHOD OF USING SAME
Gustav Richard Jansen, Scotch Plains, and Eugene E. Howe, Somerset, N.J., assignors to Merck & Co., Inc., Rahway, N.J., a corporation of New Jersey
No Drawing. Filed July 29, 1966, Ser. No. 568,739
Int. Cl. A61k 9/04, 27/00
U.S. Cl. 424—331     3 Claims

ABSTRACT OF THE DISCLOSURE

Method for combatting and curbing the appetite through the use of 2-propenyl-2-cyclohexen-1-one to induce anorexia. Compositions containing 2-propenyl-2-cyclohexen-1-one useful in appetite control.

---

This invention relates to methods for controlling and curbing the appetite and to compositions therefor. More specifically, it relates ot the use of 2-propenyl-2-cyclohexen-1-one to induce anorexia and to compositions containing that compound.

Obesity is a fairly common condition and a potentially serious one in view of the correlation between incidence of various diseases and the degree to which a person is overweight. For example, obese persons succumb statistically more frequently to cardiovascularrenal disease than do persons of normal weight. Obesity likewise results in higher death rates from diabetes, nephritis, pneumonia, cirrhosis, appendicitis, and postoperative complications. Since most cases of obesity are caused simply by an excessive intake of calories, good management of the condition can be achieved by restricting the calorie intake. Frequently, however, the patient rejects dietary restrictions, making it necessary to resort to anorexigenic drugs as adjuvants to therapy.

Most anorexigenic drugs are to a greater or lesser degree central nervous system (CNS) stimulants, and although they may be effective anorexigents, the undesirable side effects caused by the CNS activity make the use of these agents undesirable. It would be very desirable indeed if the art could provide agents which exhibit anorectic effect but which do not possess undesirable CNS activity. It is an object of this invention to provide such compounds. It is a further object to provide compositions containing certain cyclohexenones for use in curbing the appetite.

In accordance with the present invention, it has been discovered that 2-propenyl-2-cyclohexen-1-one depicted structurally as

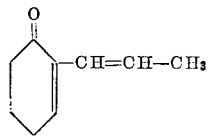

has the ability to induce anorexia when administered to a host animal. The appetite of patients is controlled through the administration of 2-propenyl-2-cyclohexen-1-one in a dosage formulation in which the active ingredient is present in an amount sufficient to provide from about 50 mg. to 400 mg. and preferably 100 mg. to 150 mg./unit dosage form. To achieve optimum effect, it is preferred that the dosage form be administered before each meal, thus providing an active ingredient daily dosage level of from 150 to 600 mg., and preferably of 300 to 450 mg.

In order to provide adequate dosage forms, the present invention contemplates incorporating the active ingredient in solid or liquid unit dosage forms such as tablets, capsules, elixirs, suspensions, and the like, or in other forms readily subdividable into unit dosage forms. In such forms, the active ingredient suitably constitutes from 1 to 40 weight percent and preferably from 5 to 30 weight percent based on the total weight of the composition. The actual amounts will vary depending upon the particular dosage form employed.

In the preparation of orally administrable compositions of the present invention, the active ingredient may be admixed with a suitable nontoxic pharmaceutical carrier. In this connection, the 2-propenyl-2-cyclohexen-1-one is a liquid under normal conditions and is, therefore, particularly suited to preparation as an adsorbate for use in solid dosage forms or dissolved in syrups or elixirs or suspended in aqueous media. In the preparation of a solid dosage form utilizing an adsorbing technique, the active ingredient may be adsorbed on such materials as silica gel, cellulose, corn starch cabosil, kaolin, talc, bentonite, and the like, and dry filled into capsules, or with the aid of suitable excipients such as binders, lubricants, disintegrating agents, fillers, and the like, may be compressed directly into tablets. There may be employed in this regard lactose, sucrose, calcium phosphate, lubricants such as magnesium stearate or glycerol, and binders such as starch and the like. In such formulations, the active ingredient is provided within the range of from 10 to 40 weight percent and preferably from 15 to 30 weight percent based on the total weight of the dosage form, there being enough active ingredient to provide an amount within the dosage level stated above.

When encapsulation is desired, the adsorbate can be directly dry filled into hard gelatin capsules as stated above or the 2-propenyl-2-cyclohexen-1-one itself directly filled into soft gelatin capsules to provide a unit dosage form containing the unadsorbed active ingredient. Similarly, various liquid formulations may be prepared for oral or parenteral administration with the aid of suitable dispersing agents, suspending agents, emulsifying agents, and the like. For example, a convenient parenterally administrable formulation can be prepared by suspending the active ingredient in saline solution along with suitable suspending agents, if desired, such as the commercially available partial esters of lauric acid, palmitic acid, oleic acid, and the like, with hexitol anhydrides such as those derived from sorbitol. Polyoxyethylene adducts of these may also be employed. In such forms the active ingredient conveniently ranges from 1 to 15 percent by weight and preferably from 5 to 10 percent by weight. Elixirs may be prepared by dissolving the active ingredient in ethyl alcohol and adding suitable excipients, if desired, such as flavoring agents, sweetening agents, and the like. Again, convenient weight concentration ranges are from 1 to 15 percent with 5 to 10 percent of active ingredients based on total weight of composition being preferred.

The following examples are given for purposes of illustration only and are not intended to limit the scope of the present invention.

EXAMPLE 1

The following procedure is followed to determine the degree of inhibition of glucose out of the stomach of the test animal. This gives an indication of the gastric emptying of ingested carbohydrates and the conversion of that into fat.

2-propenyl-2-cyclohexen-1-one is suspended in a 10% polysorbate 80 aqueous system and administered subcutaneously at the dosage levels indicated below to 20–25 gm. male mice previously maintained on a low fat, high glucose diet. Three minutes later each animal is given an oral dose of 250 mg. of glucose U–C$^{14}$ (0.25μc.)

and the animal sacrificed 60 minutes later. Both the radioactivity in the stomach and the incorporation of the $C^{14}$ activity into the epididymal fat pads is determined by radioactive counts and compared to counts obtained on animals receiving only saline. Table I shows the results obtained.

TABLE I

| Compound | Counts /min. in stomach | Percent of dose | Counts/ min. in pad | Percent inhibition |
|---|---|---|---|---|
| Saline | $1.4 \times 10^5$ | 5 | 6,880 | |
| 2-propenyl-2-cyclohexen-1-one (33 mg./kg.) | $8.1 \times 10^5$ | 28 | 3,740 | 48 |
| 2-propenyl-2-cyclohexen-1-one (100 mg./kg.) | $16.8 \times 10^5$ | 57 | 1,600 | 78 |

As can be seen, the active compound dramatically reduces the outflow from the stomach of carbohydrate as evidenced by the higher counts obtained and further reduces the incorporation of fat into the ipididymal fat pad as shown by the lower counts obtained therein.

EXAMPLE 2

In two conventional appetite and growth assays, 2-propenyl-2-cyclohexen-1-one is tested using the following procedures:

(A) Male rats weighing approximately 200 g. are starved overnight. The active compound is suspended in saline and administered orally at 33 mg./kg. and 100 mg./kg. Twenty minutes later the rats are allowed to eat ad libitum for a two-hour period. Food consumption during this period is measured and the percent inhibition in appetite ascertained by comparing with the food consumption of saline treated controls.

TABLE II

| Dose (mg./kg.) | Tretment | Food consumption (g.) | Percent inhibition |
|---|---|---|---|
| 0 | Saline | 6.1 | |
| 33 | 2-propenyl-2-cyclohexen-1-one | 4.3 | 30 |
| 100 | 2-propenyl-2-cyclohexen-1-one | 4.2 | 31 |

(B) The test compound is added to a low fat, high glucose diet at levels shown below and fed to 20 gm. male mice for 13 days. Weight change is measured over this period and compared to that of a control animal receiving the basal diet showing no active drug added.

TABLE III

| Wt. percent active compound in diet | Drug dose, mg./kg./day | Weight gain, gms. | Food intake, gm./day |
|---|---|---|---|
| 0 | 0 | 9.4 | 7.0 |
| 0.02 | 40 | 7.3 | 6.0 |
| 0.05 | 90 | 3.2 | 5.0 |
| 0.25 | 310 | −3.5 | 3.1 |
| 0.35 | 400 | −5.0 | 2.7 |

Each of A and B above show quite emphatically that 2-propenyl-2-cyclohexen-1-one has the ability to reduce the amount of food intake and cause actual weight losses.

EXAMPLE 3

Preparation of 2-propenyl-2-cyclohexen-1-one

A 12 liter three-necked flask equipped with a 2 ft. packed column and a still head which permits subsequent separation of an aqueous phase was charged with 2940 g. (30 moles) cyclohexanone, 1681 g. (30 moles) propargyl alcohol, 4000 g. p-xylene, 120 g. benzene, 1.0 g. p-toluenesulfonic acid and 1.0 g. hydroquinone.

The still is blanketed with nitrogen, sampled for gas chromatographic analysis and heated to reflux moderately. Water is formed by the reaction and an azeotrope of water and propargyl alcohol collected under a layer of benzene. The course of the reaction is followed by the rate of water separation and by analyzing 2 cc. samples taken at 2-hour intervals from the base heater using a syringe. Each sample is quickly analyzed by gas chromatography using a 10-ft. column packed with 20% Carbowax 20M on Chromosorb W programing from 140° to 240° C. The decanter separates 400 cc. in 12 hours, 700 cc. in 24 hours, and 735 cc. in 30 hours where the reaction is stopped. The base heater temperature increases from 112° C. to 133° C. in this period. The diluting solvent xylene and unreacted feed materials are rapidly distilled off up to a head temperature of 60° C. at 10 mm. pressure. The column is removed and 1100 g. of crude products are flash distilled up to a base heater temperature of 150° C. at 2 mm. This crude is fractionated in a 3' x 2" Penn State packed still over 30 hours at 5–10% takeoff; head temperature is 46–47° C. at 1 mm. Cuts contain 105 g. of 2-propenyl-2-cyclohexenone. Loss of residue is 242 g.

The allenic cyclohexanone fractions are isomerized to give a 39% concentration of 2-propenyl-2-cyclohexenone by vaporizing it at a 100 cc. per hour rate and passing the vapors with nitrogen through a 1" x 10" stainless steel furnace tube heated to 400–430° C.

EXAMPLE 4

200 mg. of 2-propenyl-2-cyclohexen-1-one are intimately admixed with 500 mg. of corn starch to provide a dry adsorbate. The adsorbate is then encapsulated and the hard gelatin capsules are then coated with cellulose acetate phthalate. One capsule is administered to an obese person three times daily to induce anorexia.

What is claimed is:

1. The method for curbing appetite which comprises administering to a host a composition consisting of about 50–450 mg. of 2-propenyl-2-cyclohexen-1-one in a nontoxic pharmaceutical carrier.

2. The method according to claim 1 wherein the 2-propenyl-2-cyclohexen-1-one is administered at a dosage level of from 100 mg. to 150 mg. per unit dosage form.

3. A hard gelatin capsule containing from about 50–400 mg. of 2-propenyl-2-cyclohexen-1-one adsorbed on a non-toxic pharmaceutical carrier.

References Cited

UNITED STATES PATENTS 3,431,305  4/1969  Thompson et al. _____ 260—586
2,927,134  3/1960  Normant _____ 260—586

OTHER REFERENCES

Comptes Rendus, pp. 3196–3198, No. 19, 1960.

ALBERT T. MEYERS, Primary Examiner

H. M. ELLIS, Assistant Examiner

U.S. Cl. X.R.

260—586